United States Patent
Rehn et al.

(10) Patent No.: US 11,177,716 B2
(45) Date of Patent: Nov. 16, 2021

(54) BRUSH HOLDER FOR ELECTRICAL CONTACT BRUSHES

(71) Applicant: AB Dynamoborstfabriken, Vadstena (SE)

(72) Inventors: Magnus Rehn, Vadstena (SE); Erik Björklund, Vadstena (SE)

(73) Assignee: AB DYNAMOBORSTFABRIKEN, Vadstena (SE)

( * ) Notice: Subject to any disclaimer, the term of this patent is extended or adjusted under 35 U.S.C. 154(b) by 0 days.

(21) Appl. No.: 16/767,533

(22) PCT Filed: Nov. 28, 2018

(86) PCT No.: PCT/EP2018/082843
§ 371 (c)(1),
(2) Date: May 27, 2020

(87) PCT Pub. No.: WO2019/106013
PCT Pub. Date: Jun. 6, 2019

(65) Prior Publication Data
US 2020/0313497 A1 Oct. 1, 2020

(30) Foreign Application Priority Data
Nov. 29, 2017 (SE) .................................. 1751467-0

(51) Int. Cl.
*H02K 5/14* (2006.01)
*H01R 39/38* (2006.01)
*H01R 39/58* (2006.01)

(52) U.S. Cl.
CPC ........... *H02K 5/141* (2013.01); *H01R 39/385* (2013.01); *H01R 39/58* (2013.01)

(58) Field of Classification Search
CPC ........ H02K 5/146; H01R 39/39; H01R 39/38; H01R 39/385; H01R 39/42
See application file for complete search history.

(56) References Cited

U.S. PATENT DOCUMENTS 994,726 A 6/1911 Dorman
2,299,376 A * 10/1942 Buerosse ............... H01R 39/38
310/244
(Continued)

FOREIGN PATENT DOCUMENTS

DE 2743359 A1 4/1979
DE 4444154 A1 6/1996
(Continued)

OTHER PUBLICATIONS

International Search Report for International Application No. PCT/EP2018/082843, dated Mar. 7, 2019 (15 pages).
(Continued)

*Primary Examiner* — Dang D Le
(74) *Attorney, Agent, or Firm* — Kagan Binder, PLLC (57) ABSTRACT

A brush holder for electrical machines has a clamping piece with a first mounting part and a second clamping part, which when assembled define a clamping hole to be assembled around a spindle; and two brush holder arms pivotally mounted on the first mounting part of said clamping piece, and adapted to receive and retain a brush. The arms have an upper side which is opposite to a lower side facing a slip ring; at least one biasing spring to act upon said brush holder arms in such a way that said brush holder arms move pivotally towards and presses said brushes against the slip ring. A conductive wire connects the brush to the clamping piece. A brush holder arm locking mechanism is adapted to be inserted into a slot in the second clamping part. A brush locking pin retains the brush in said brush holder arm and provided in corresponding bores arranged in the brush holder arm and the brush. The brush locking pin has a pipe portion and a spring portion arranged inside the pipe and that protrudes from a slot in a wall of said pipe. The mounting part of said clamping piece is provided with a brush arm stop
(Continued)

to limit a pivot movement of the brush holder arm towards a slip ring.

18 Claims, 5 Drawing Sheets

(56) References Cited

U.S. PATENT DOCUMENTS

| | | |
|---|---|---|
| 3,097,559 A | 7/1963 | Chapman |
| 4,381,468 A | 4/1983 | Adam et al. |
| 4,638,204 A | 1/1987 | Kirchner et al. |
| 6,085,766 A | 7/2000 | Geary |

FOREIGN PATENT DOCUMENTS

| | | |
|---|---|---|
| DE | 20217617 U1 | 2/2003 |
| EP | 3113299 A1 | 1/2017 |
| WO | 2013025153 A1 | 2/2013 |

OTHER PUBLICATIONS

Swedish Search Report for Swedish Application No. 1751467-0, dated Jun. 29, 2018 (2 pages).
E-spacenet English Abstract of DE 2743359.
E-spacenet English Translation of DE 4444154.
E-spacenet English Abstract of DE 20217617.
International Preliminary Report on Patentability for International Application No. PCT/EP2018/082843, dated Jun. 11, 2020 (9 pages).

* cited by examiner

BRUSH HOLDER FOR ELECTRICAL CONTACT BRUSHES

CROSS-REFERENCE TO RELATED APPLICATIONS

This application claims priority to International Application No. PCT/EP2018/082843, filed Nov. 28, 2018 and titled "BRUSH HOLDER FOR ELECTRICAL CONTACT BRUSHES," which in turn claims priority from a Swedish Patent Application having serial number 1751467-0, filed Nov. 29, 2017, titled "BRUSH HOLDER FOR ELECTRICAL CONTACT BRUSHES," both of which are incorporated herein by reference in their entireties.

TECHNICAL FIELD

The present document relates to a brush holder for electrical machines.

BACKGROUND

Brush holders for electrical machines typically discloses a clamping piece with one or two pivotally mounted brush holder arms. The brush holder arms are adapted to receive and retain a brush, which when in use is pressed against the surface of a rotating slip ring.

Further the brush holders are usually provided with at least one tension spring that acts upon the brush holders arm/s. The tension spring enables firm contact between the brush and the slip ring. However, the pivoted movement of the brush holder arm/s is a problem during mounting of the brush holder and during service when the brush is changed, as the brush holder arm/s will try to move towards the slip ring. The service technician then have to hold the brush holder arm/s by hand, making the mounting more difficult.

DE 27 43 359 discloses a brush holder for electrical machines that has a clamping piece provided with a stirrup, which has a bore hole adapted to interconnect with a locking mechanism, such as a hook, arranged on the upper side of the brush holder arm. This provides the brush holder with the function to lock the brush holder arm in an upward directed position.

The brush of the brush holder is typically mounted to the brush holder arm by means of screws and bolts. Although this assembly holds the brush in place, it requires certain tools for the assembly/disassembly of the brush and it is a time-consuming process, especially as the assembly/disassembly is performed frequently as the brush wears and thereby must be changed.

The brushes may wear faster than expected and may thereby be worn out before the planned service period. This poses a problem, as a worn out brush could damage or even destroy the slip ring. The uncertainty of the wear of the brush further complicates the service of the brush holders.

SUMMARY

It is an object of the present disclosure, to provide an improved brush holder, which eliminates or alleviates at least some of the disadvantages of the prior art.

A specific object of the present disclosure is to provide an improved brush holder that enables service and maintenance of the brush holder.

The invention is defined by the appended independent claims. Embodiments are set forth in the appended dependent claims and in the following description and drawings.

According to a first aspect, there is provided a brush holder for electrical machines comprising a clamping piece comprising a first mounting part and a second clamping part, which when assembled define a clamping hole, which is adapted to be assembled around a spindle; and two brush holder arms, wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring; at least one biasing spring which spring is adapted to act upon said brush holder arms in such a way that said brush holder arms move pivotally towards a slip ring, and when in use presses said brushes against the slip ring; at least one conductive wire connecting the brush to the clamping piece; and wherein a brush holder arm locking mechanism is arranged at or along the upper side of each respective brush holder arm, that said locking mechanism is adapted to be inserted into a slot arranged in the second clamping part; and wherein a brush locking pin is arranged to retain the brush in said brush holder arm, which pin when in use is provided in corresponding bores arranged in the brush holder arm and the brush, wherein said brush locking pin comprises a pipe portion and a spring portion, wherein said spring portion is arranged inside the pipe and has a portion protruding on the outside of said pipe portion from a slot in a wall of said pipe; and wherein said mounting part of said clamping piece is provided with a brush arm stop, arranged to limit a pivot movement of the brush holder arm in a direction towards a slip ring.

Through the provision of the brush holder arm locking mechanism, the brush holder arms can be effectively retained in an upwardly pivoted position when the brush holder arm locking mechanism is inserted into the clamping piece. By an upwardly pivoted position is meant that the brush holder arm is in a substantially horizontal line, i.e. is aligned, with the clamping piece.

The brush holder arm locking mechanism thereby allows the arm to be locked in a so called service position, which will enable the changing of the brush during service as the operator doesn't have to hold the brush holder arms in an upward position by hand. The brush holder arm locking mechanism thus also enables a faster and safer process of changing and mounting the entire brush holder.

The brush locking pin enables a quick and easy change of the brush as no screws or bolts are involved in the assembly/disassembly of the brush to/from the brush holder arm.

The brush arm stop prevents the brush holder arm from touching and damaging the slip ring when the brush is worn out. The brush arm stop also prevents the brush holder arm from touching and damaging the slip ring in the case that the brush holder arm would be dropped without no brush mounted on the brush holder arm, for example during mounting of the brush holder or during service when the brush is changed.

According to an embodiment of the first aspect of the solution, the brush holder arm locking mechanism comprises a leaf spring, wherein said leaf spring is adapted to interact with a bar arranged within the brush holder arm.

This prevents the brush holder arm locking mechanism from moving during normal run of the brush holder and prevents the brush holder arm locking mechanism from interfering with the brush holder even when the brush holder is mounted up-side down. The leaf spring in conjunction with the bar also prevents accidentally release of the brush holder arm locking mechanism when the brush holder arm is locked in the upward position.

According to another embodiment of the first aspect of the solution, the slot in the wall of the pipe portion is arranged at a middle portion of the pipe, in such a way that said protruding portion of the spring is adapted to fit into a corresponding slot in the brush.

According to another embodiment of the first aspect of the solution, the slot in the wall of the pipe portion is arranged at a first end portion of the pipe in such a way that said protruding portion of the spring is adapted to be positioned outside the brush holder arm.

This makes it easy to remove the brush locking pin and it enables the disassembly of the brush as there is no need for any tool when removing the brush locking pin.

According to another embodiment of the first aspect of the solution, a second end portion of the pipe is provided with a flange, wherein said flange has a diameter larger than the diameter of the bore in said brush holder arm.

The flange provides the brush locking pin with a gripping surface, making it easy for the operator to grip the brush locking pin and pulling it out in a lateral direction to release the brush.

According to another embodiment of the first aspect of the solution, the brush arm stop may be a pin. Said stop or pin may be provided with insulation, such that the stop or pin is insulated from the rest of the brush holder, wherein said insulated stop or pin is attached to a cable when in use, whereby an electrical signal is provided or generated when the brush holder arm touches said insulated pin.

This will alert the operator that the brush is worn out and that the brush needs to be changed. The risk of damages on the slip ring can thereby be decreased.

According to another embodiment of the first aspect of the solution, the brush holder arm may be provided with a weak spring, which when in use will provide or establish an electrical signal when said weak spring connects the brush holder arm and the insulated pin of the brush arm stop.

This provides the brush holder with an early warning signal system, as the electrical signal is generated a short time before the brush is worn out, alerting the operator that it is time to change the brush.

According to another embodiment of the first aspect of the solution, the brush arm stop may be provided with a weak spring, which when in use will generate an electrical signal when said weak spring connects the insulated pin of the brush arm stop and the brush holder arm.

This also provides the brush holder with an early warning signal system. The early warning signal system enables the planning of service activities. It also provides opportunities for cost reduction as the service can be performed only when needed.

According to a second aspect of the present disclosure there is provided a brush holder for electrical machines comprising a clamping piece comprising a first mounting part and a second clamping part, which when assembled define a clamping hole, which is adapted to be assembled around a spindle; and two brush holder arms, wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring; at least one biasing spring which spring is adapted to act upon said brush holder arms in such a way that said brush holder arms move pivotally towards a slip ring, and when in use presses said brushes against the slip ring; at least one conductive wire connecting the brush to the clamping piece; and wherein a brush holder arm locking mechanism is arranged at or along the upper side of each respective brush holder arm, that said locking mechanism is adapted to be inserted into a slot arranged in the second clamping part.

According to an embodiment of the second aspect of the solution, the said brush holder arm locking mechanism comprises a leaf spring, wherein said leaf spring is adapted to interact with a bar arranged within the brush holder arm.

According to a third aspect of the present disclosure there is provided a brush holder for electrical machines comprising a clamping piece comprising a first mounting part and a second clamping part, which when assembled define a clamping hole, which is adapted to be assembled around a spindle; and two brush holder arms, wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring; at least one biasing spring which spring is adapted to act upon said brush holder arms in such a way that said brush holder arms move pivotally towards a slip ring, and when in use presses said brushes against the slip ring; at least one conductive wire connecting the brush to the clamping piece; and wherein a brush locking pin is arranged to retain the brush in said brush holder arm, which pin when in use is provided in corresponding bores arranged in the brush holder arm and the brush, wherein said brush locking pin comprises a pipe portion and a spring portion, wherein said spring portion is arranged inside the pipe and has a portion protruding on the outside of said pipe portion from a slot in a wall of said pipe.

According to an embodiment of the third solution, the said slot in the wall of the pipe portion is arranged at a middle portion of the pipe, in such a way that said protruding portion of the spring is adapted to fit into a corresponding slot in the brush.

According to another embodiment of the third aspect of the solution, the said slot in the wall of the pipe portion is arranged at a first end portion of the pipe in such a way that said protruding portion of the spring is adapted to be positioned outside the brush holder arm.

According to another embodiment of the third aspect of the solution, a second end portion of the pipe is provided with a flange, wherein said flange has a diameter larger than the diameter of the bore in said brush holder arm.

According to a fourth aspect of the present disclosure there is provided a brush holder for electrical machines comprising a clamping piece comprising a first mounting part and a second clamping part, which when assembled define a clamping hole, which is adapted to be assembled around a spindle; and two brush holder arms, wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring; at least one biasing spring which spring is adapted to act upon said brush holder arms in such a way that said brush holder arms move pivotally towards a slip ring, and when in use presses said brushes against the slip ring; at least one conductive wire connecting the brush to the clamping piece; and wherein said mounting part of said clamping piece is provided with a brush arm stop, arranged to limit a pivot movement of the brush holder arm in a direction towards a slip ring.

According to an embodiment of the fourth aspect of the solution the said brush arm stop may be for instance a pin.

The pin or stop may be provided with insulation, such that the stop is insulated from the rest of the brush holder, wherein said insulated stop or pin is attached to a cable when in use, whereby an electrical signal is provided or generated when the brush holder arm touches said insulated pin.

According to another embodiment of the fourth aspect of the solution, the brush holder arm is provided with a weak spring, which when in use will generate an electrical signal when said weak spring connects the brush holder arm and the insulated pin of the brush arm stop.

According to another embodiment of the fourth aspect of the solution, the brush arm stop is provided with a weak spring, which when in use will generate an electrical signal when said weak spring connects the insulated pin of the brush arm stop and the brush holder arm.

BRIEF DESCRIPTION OF THE DRAWINGS

Embodiments of the present solution will now be described, by way of example, with reference to the accompanying schematic drawings in which.

DESCRIPTION OF EMBODIMENTS

Figure 1:
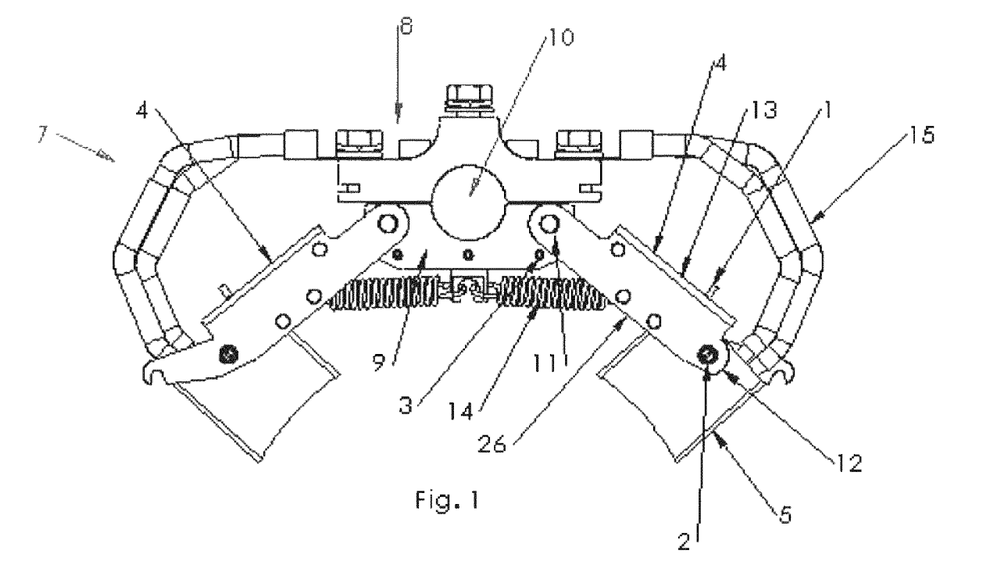
FIG. 1 is a view of a brush holder with a brush holder arm locking mechanism, a brush locking pin and a brush arm stop.

FIG. 1 illustrates a brush holder 7 for electrical machines. The brush holder has a clamping piece 8 comprising a first mounting part 9 and a second clamping part 6. When assembled, the first mounting part 9 and the second clamping part 6 defines a clamping hole 10, which is adapted to be assembled around a spindle.

The brush holder 7 further comprises two brush holder arms 4. The brush holder arms have a proximal end 11 and a distal end 12. The proximal ends 11 of the brush holder arms 4 are pivotally mounted on the first mounting part 9 of the clamping piece 8. The distal ends 12 of the brush holder arms 4 are each adapted to receive and hold or retain an electrical brush 5.

Each brush holder arm 4 further has an upper side 13 which is opposite to a lower side 26 facing a slip ring.

The brush holder 7 further comprises at least one biasing spring 14. FIG. 1 illustrates a brush holder with two brush holder arms 4, wherein each brush holder arm is connected to a respective biasing spring 14. A first end of each biasing spring is connected to the respective brush holder arm 4, and a second end of each biasing spring is connected to the first mounting part 9 of the clamping piece 8. Although not illustrated, there is also an alternative where only one single tension spring connects the two brush holder arms. The first end of the tension spring is then connected to one of the brush holder arms and the second end of the tension spring is connected to the other brush holder arm.

The at least one biasing spring 14 is adapted to act upon the brush holder arm 4 in such a way that the brush holder arm move pivotally towards a slip ring, and when in use presses the brush 5 against the slip ring. The biasing spring may be a tension spring, or two tension springs attached at respective ends to the brush holder arm and the mounting part of the clamping device.

The brush holder further comprises at least one conductive wire 15, as illustrated in FIG. 1. The conductive wire 15 electrically connects the brush 5 to the clamping piece 8. The conductive wire is provided on the outside of the brush holder arm, that is it does not run on the inside of the brusholder arm. This allows for the below described features to be included in the brush holder.

The brush holder 7 further comprises a brush holder arm locking mechanism 1, as illustrated in FIG. 1. FIG. 2 (FIGS. 2a-2d) further illustrates different views of the brush holder arm locking mechanism. The brush holder arm locking mechanism 1 is arranged at or along the upper side of each respective brush holder arm 4. The brush holder arm locking mechanism 1 is adapted to be inserted into a slot 16 arranged in the second clamping part 6. This means that the brush holder arms can be effectively retained in an upwardly pivoted position when the brush holder arm locking mechanism is inserted into the clamping piece. By pivotally moving the brush holder arm/arms 4 to an upwardly pivoted position, means that the brush holder arm is in a horizontal line with the clamping piece, and then pushing or pressing the brush holder arm locking mechanism 1 in the direction towards the clamping piece, i.e. insert an extended part of the locking mechanism in the slot 16, the brush holder arm 4 can be locked and retained in the upwardly pivoted position, as illustrated in FIGS. 2c-2d. By pushing the brush holder arm locking mechanism 1 in the opposite direction of the clamping piece, the brush holder arm 4 may be released.

Figure 2A:
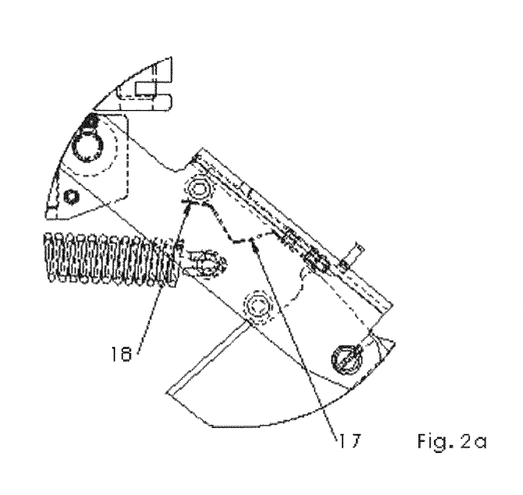
FIGS. 2a-2d are different views of a brush holder arm locking mechanism.
Figure 2B:
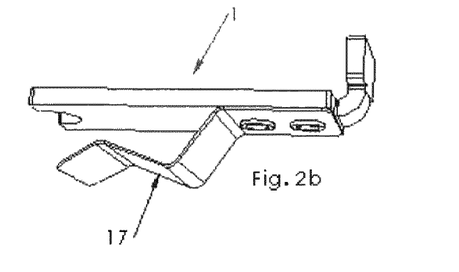
Figure 2C:
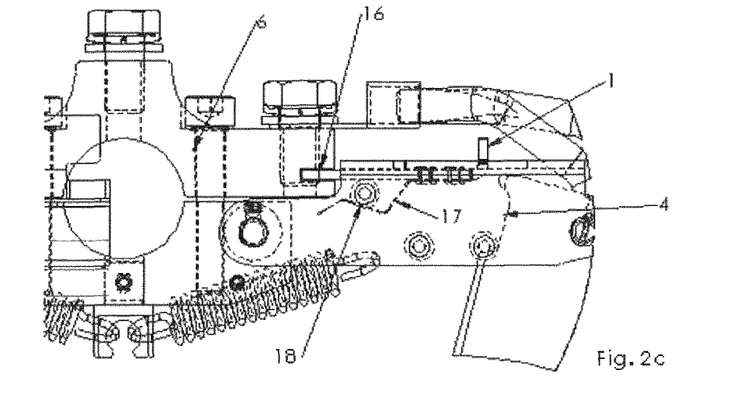
Figure 2D:
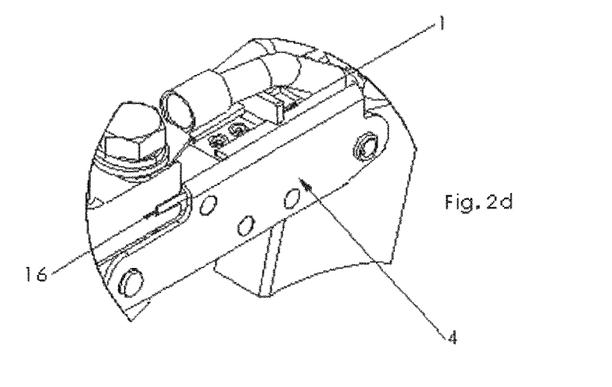

The brush holder arm locking mechanism 1 may further comprise a leaf spring 17, as illustrated in FIGS. 2a-2c. The leaf spring is adapted to interact with a bar 18 arranged within the brush holder arm, as illustrated in FIG. 2a and FIG. 2c. The leaf spring 17 in conjunction with the bar 18 prevent the brush holder arm locking mechanism 1 from moving during normal run of the brush holder, as illustrated in FIG. 2a. It also prevents the brush holder arm locking mechanism 1 from interfering with the brush holder 7, even when the brush holder is mounted up-side down. The leaf spring 17 in conjunction with the bar 18 also prevents accidentally release of the brush holder arm locking mechanism 1 when the brush holder arm 4 is locked in the upward position, as illustrated in FIG. 2c.

The brush holder 7 further comprises a brush locking pin 2, as illustrated in FIG. 1. The brush locking pin 2 is further illustrated in FIG. 3 (FIGS. 3a-3f). The brush locking pin 2 is arranged to retain the brush 5 in the brush holder arm 4. The brush locking pin 2, when in use, is provided in corresponding bores arranged in the brush holder arm 4 and the brush 5. The brush locking pin is then working as a hinge-pin, allowing the brush to rotate around it. The brush locking pin 2 comprises a pipe portion 19 and a spring portion 20. The spring portion 20 is arranged inside the pipe 19, as illustrated in FIG. 3b-3d and FIG. 3f. The pipe portion 19 further has a slot 22 in a wall of the pipe, as illustrated in FIG. 3a-3b and FIG. 3e-3f. The spring portion 20 has a portion 21 protruding on the outside of the pipe portion 19 from the slot 22, as illustrated in FIG. 3 (FIGS. 3a-3f). This means that the portion 21 protruding on the outside of the pipe 19, i.e. a "bump", bends down upon pushing the brush locking pin 2 in a lateral direction, when provided in the corresponding bores arranged in the brush holder arm 4 and the brush 5, whereby the brush locking pin can be removed and the brush can be released from the brush holder arm in an easy manner.

Figure 3A:
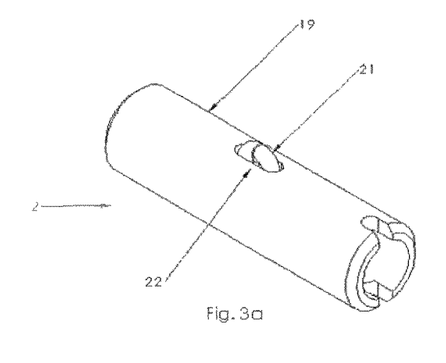
FIGS. 3a-3f are different views of a brush locking pin.
Figure 3B:
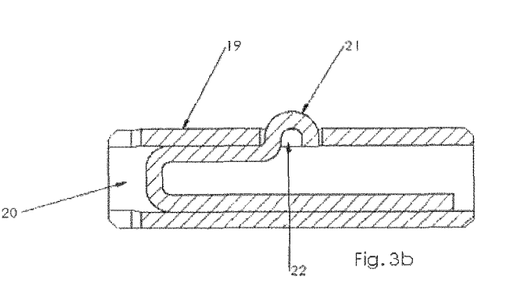
Figure 3C:
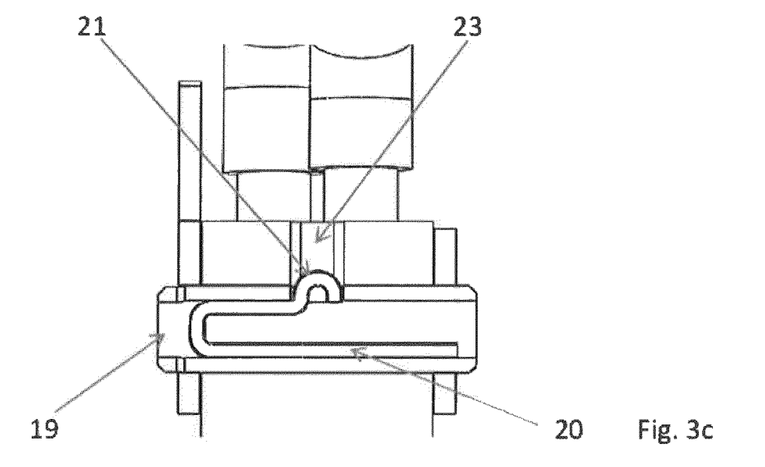

The slot 22 in the wall of the pipe portion 19 may be arranged at a middle portion of the pipe, as illustrated in FIGS. 3a-3c. The protruding portion 21 of the spring 20 is thereby adapted to fit into a corresponding slot 23 of the brush 5. This means that when the brush locking pin 2 is mounted through the brush holder arm 4 and the brush 5, the protruding portion 21 of the spring will be inserted into the corresponding slot 23 of the brush 5, as illustrated in FIG. 3c. This will lock the position of the brush locking pin 2 and hold the brush 5 in place. To release the brush 5 from the brush holder arm 4, the brush holding pin 2 is pushed in a lateral direction, for example by using a screw driver or an allen key.

Figure 3D:
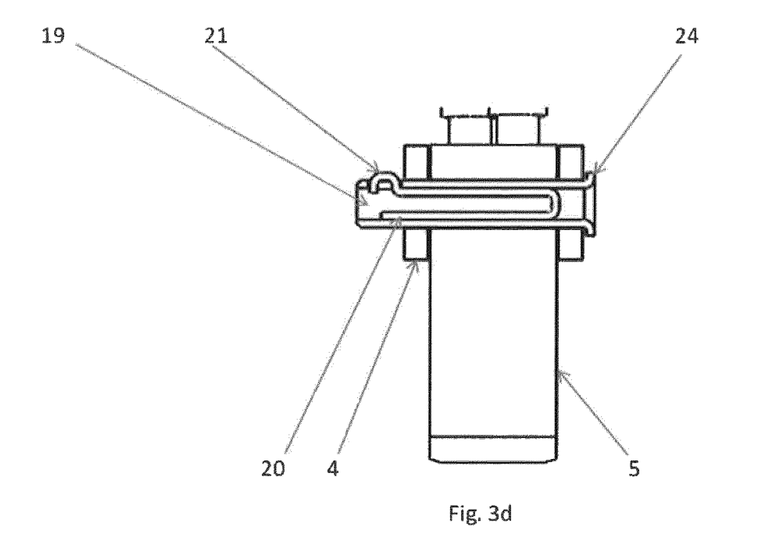
Figure 3E:
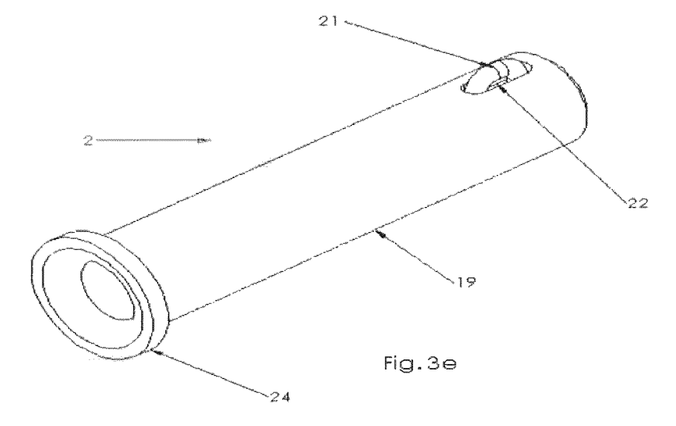
Figure 3F:
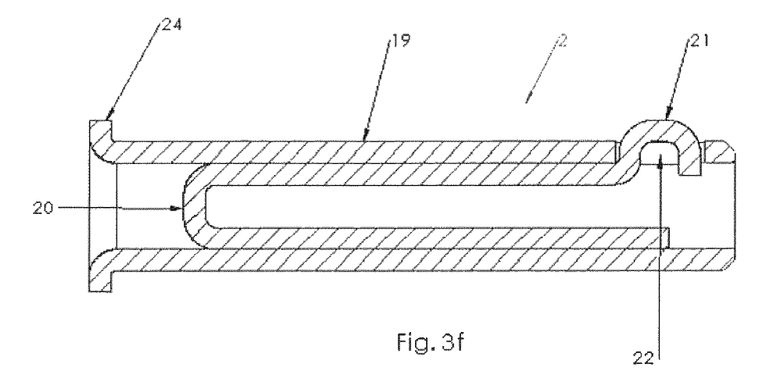

The slot 22 in the wall of the pipe portion 19 may be arranged at a first end portion of the pipe, as illustrated in FIGS. 3d-3f. The protruding portion 21 of the spring is thereby adapted to be positioned outside the brush holder arm 4. This means that when the brush locking pin 2 is mounted through the brush holder arm 4 and the brush 5, the protruding portion 21 of the spring will lock the position of the brush locking pin 2 against the side of the brush holder arm 4, as illustrated in FIG. 3d. By locking the position of the brush locking pin against the side of the brush holder arm 4, there is no need for a slot for the protruding portion 21 in the brush. To release the brush 5 from the brush holder arm 4, the brush holding pin 2 is pushed in a lateral direction.

Figure 4A:
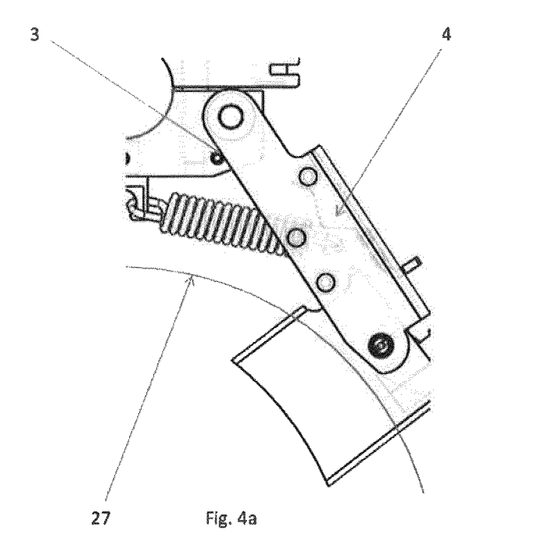
FIGS. 4a-4c are different views of a brush arm stop.

The brush locking pin 2 with the slot 22 arranged at the first end portion may further be provided with a flange 24 at a second end portion of the pipe, as illustrated in FIGS. 3d-3f. The flange 24 has a diameter larger than the diameter of the bore in the brush holder arm 4. The flange 24 provides the brush locking pin 2 with a gripping surface, making it easy for the operator to grip the brush locking pin and pulling it out in a lateral direction to release the brush. The mounting part 9 of the clamping piece 8 is further provided with a brush arm stop 3, as illustrated in FIG. 1. The brush arm stop 3 is further illustrated in FIGS. 4a-4c. The brush arm stop 3 is arranged to limit a pivot movement of the brush holder arm 4 in a direction towards a slip ring, which is shown as a representation of a slip ring 27. The brush arm stop 3 may be arranged as a pin or other type of protrusion, that protrudes from the mounting part to provide a sufficient physical stop of the brush arm 4. This prevents the brush holder arm 4 from touching and damaging the slip ring 27 when the brush 5 is worn out. The brush arm stop 3 also prevents the brush holder arm 4 from touching and damaging the slip ring in the case that the brush holder arm 4 would be dropped without no brush 5 mounted on the brush holder arm 4, for example during mounting of the brush holder or during service when the brush is changed.

Figure 4B:
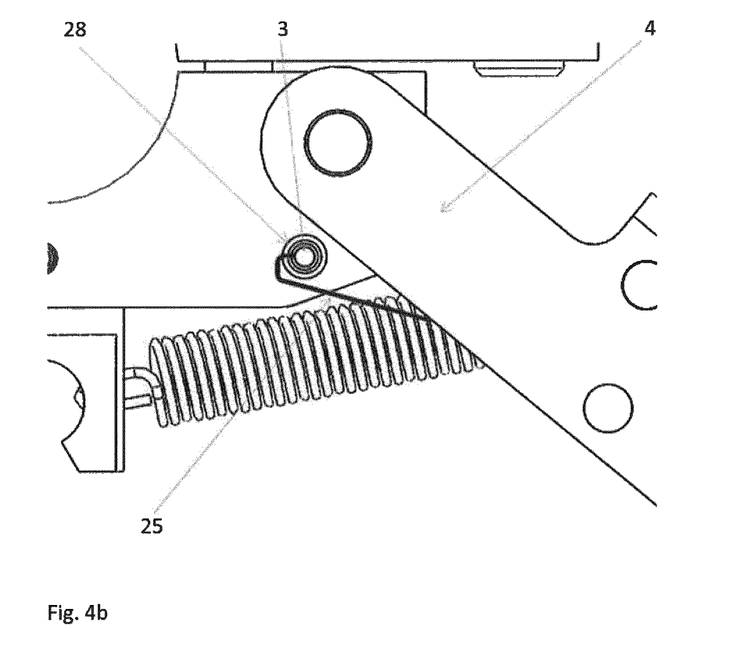
Figure 4C:
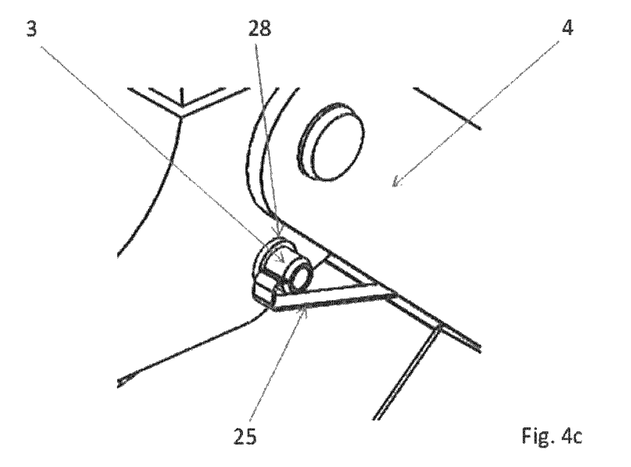

The brush arm stop 3 may be a pin, as illustrated in FIGS. 4b-4c. The brush arm stop may however have any shape or configuration suitable to provide a physical stop of the brush arm.

The brush arm stop or pin may, according to one alternative, be provided with an insulation 28, such that the brush arm stop is insulated from the rest of the brush holder. The insulated pin may be attached to a cable. This means that an electrical signal will be generated or provided when the brush holder arm 4 touches the insulated stop or pin. This arrangement will alert the operator that the brush 5 is worn out and that the brush needs to be changed.

The brush holder arm 4 may further be provided with a weak spring 25, as illustrated in FIGS. 4b-4c. An electrical signal will be provided or generated when the weak spring 25 connects the brush holder arm 4 and the insulated stop of the brush arm stop 3. The signal is generated by a difference in voltage between the brush holder arm 4 and the insulated stop. This provides the brush holder system and the operator or the electrical system into which the brush holder is arranged, with an early warning signal system, as the electrical signal is generated a before the brush is completely worn out, alerting the operator that it is time to change the brush.

As an alternative, the brush arm stop 3 may be provided with a weak spring 25, which will provide the same function as when the weak spring 25 is provided at the brush holder arm 4.

The invention claimed is:

1. A brush holder for electrical machines comprising:
   a clamping piece comprising a first mounting part and a second clamping part, which when assembled enclose a clamping hole, which is adapted to be assembled around a spindle;
   two brush holder arms wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring;
   at least one biasing spring, which spring is adapted to act upon said brush holder arms in such a way that said brush holder arms move pivotally towards a slip ring, and when in use presses said brushes against the slip ring; and
   at least one conductive wire connecting the brush to the clamping piece;
   wherein a brush holder arm locking mechanism is arranged at or along the upper side of each respective brush holder arm,
   wherein said locking mechanism is adapted to be inserted into a slot arranged in the second clamping part,
   wherein a brush locking pin is arranged to retain the brush in said brush holder arm, which pin when in use is provided in corresponding bores arranged in the brush holder arm and the brush,
   wherein said brush locking pin comprises a pipe portion and a spring portion, wherein said spring portion is arranged inside the pipe and has a portion protruding on the outside of said pipe portion from a slot in a wall of said pipe, and
   wherein said mounting part of said clamping piece is provided with a brush arm stop, arranged to limit a pivot movement of the brush holder arm in a direction towards a slip ring.

2. The brush holder according to claim 1, wherein said brush holder arm locking mechanism comprises a leaf spring, wherein said leaf spring is adapted to interact with a bar arranged within the brush holder arm.

3. The brush holder according to claim 1, wherein said slot in the wall of the pipe portion is arranged at a middle portion of the pipe, in such a way that said protruding portion of the spring is adapted to fit into a corresponding slot in the brush.

4. The brush holder according to claim 1, wherein said slot in the wall of the pipe is arranged at a first end portion of the pipe in such a way that said protruding portion of the spring is adapted to be positioned outside the brush holder arm.

5. The brush holder according to claim 4, wherein a second end portion of the pipe is provided with a flange, wherein said flange has a diameter larger than the diameter of the bore in said brush holder arm.

6. The brush holder according to claim 1, wherein said brush arm stop is further provided with insulation, such that the brush arm stop is insulated from the rest of the brush holder, and wherein said insulated brush arm stop is attached to a cable, whereby an electrical signal is provided when the brush holder arm touches said insulated brush arm stop.

7. The brush holder according to claim 6, wherein the brush holder arm is provided with a weak spring, which provides an electrical signal when said weak spring connects to the brush holder arm and the insulated brush arm stop.

8. The brush holder according to claim 6, wherein the brush arm stop is provided with a weak spring, which provides an electrical signal when said weak spring connects to the insulated pin of the brush arm stop and the brush holder arm.

9. A brush holder for electrical machines comprising:
a clamping piece comprising a first mounting part and a second clamping part which when assembled define a clamping hole, which is adapted to be assembled around a spindle; and
two brush holder arms wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring;
at least one biasing spring, which spring is adapted to act upon said brush holder arms in such a way that said brush holder arms move pivotally towards a slip ring, and when in use presses said brushes against the slip ring; and
at least one conductive wire connecting the brush to the clamping piece;
wherein a brush holder arm locking mechanism is arranged at or along the upper side of each respective brush holder arm, and
wherein said locking mechanism is adapted to be inserted into a slot arranged in the second clamping part.

10. The brush holder according to claim 9, wherein said brush holder arm locking mechanism comprises a leaf spring, wherein said leaf spring is adapted to interact with a bar arranged within the brush holder arm.

11. A brush holder for electrical machines comprising:
a clamping piece comprising a first mounting part and a second clamping part which when assembled define a clamping hole, which is adapted to be assembled around a spindle; and
two brush holder arms wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring;
at least one biasing spring, which spring is adapted to act upon said brush holder arms in such a way that said brush holder arms move pivotally towards a slip ring, and when in use presses said brushes against the slip ring;
at least one conductive wire connecting the brush to the clamping piece;
wherein a brush locking pin is arranged to retain the brush in said brush holder arm, which pin when in use is provided in corresponding bores arranged in the brush holder arm and the brush, and
wherein said brush locking pin comprises a pipe portion and a spring portion, wherein said spring portion is arranged inside the pipe and has a portion protruding on the outside of said pipe portion from a slot in a wall of said pipe.

12. The brush holder according to claim 11, wherein said slot in the wall of the pipe portion is arranged at a middle portion of the pipe, in such a way that said protruding portion of the spring is adapted to fit into a corresponding slot in the brush.

13. The brush holder according to claim 11, wherein said slot in the wall of the pipe is arranged at a first end portion of the pipe in such a way that said protruding portion of the spring is adapted to be positioned outside the brush holder arm.

14. The brush holder according to claim 13, wherein a second end portion of the pipe is provided with a flange, wherein said flange has a diameter larger than the diameter of the bore in said brush holder arm.

15. A brush holder for electrical machines comprising:
a clamping piece comprising a first mounting part and a second clamping part which when assembled define a clamping hole, which is adapted to be assembled around a spindle; and
two brush holder arms wherein a proximal end of said arm is pivotally mounted on the first mounting part of said clamping piece, and wherein a distal end of said arm is adapted to receive and retain a brush, and wherein said arms have an upper side which is opposite to a lower side facing a slip ring;
at least one biasing spring, which spring is adapted to act upon said brush holder arms in such a way that said brush holder arms move pivotally towards a slip ring, and when in use presses said brushes against the slip ring; and
at least one conductive wire connecting the brush to the clamping piece;
wherein said mounting part of said clamping piece is provided with a brush arm stop, arranged to limit a pivot movement of the brush holder arm in a direction towards a slip ring.

16. The brush holder according to claim 15, wherein said brush arm stop is further provided with insulation such that the brush arm stop is insulated from the rest of the brush holder, and wherein said insulated pin is attached to a cable, whereby an electrical signal is provided when the brush holder arm touches said insulated pin.

17. The brush holder according to claim 16, wherein the brush holder arm is provided with a weak spring, which provides an electrical signal when said weak spring connects the brush holder arm and the insulated pin of the brush arm stop.

18. The brush holder according to claim 16, wherein the brush arm stop is provided with a weak spring, which will provide an electrical signal when said weak spring connects the insulated pin of the brush arm stop and the brush holder arm.

* * * * *

UNITED STATES PATENT AND TRADEMARK OFFICE
CERTIFICATE OF CORRECTION

| | | |
|---|---|---|
| PATENT NO. | : 11,177,716 B2 | Page 1 of 1 |
| APPLICATION NO. | : 16/767533 | |
| DATED | : November 16, 2021 | |
| INVENTOR(S) | : Magnus Rehn and Erik Björklund | |

It is certified that error appears in the above-identified patent and that said Letters Patent is hereby corrected as shown below:

In the Claims

Claim 15, Line 25, of Column 10 "around a spindle; and" should be -- around a spindle; --

Signed and Sealed this
Twenty-seventh Day of September, 2022

Katherine Kelly Vidal
*Director of the United States Patent and Trademark Office*